United States Patent
Hemphill et al.

(10) Patent No.: US 10,214,250 B2
(45) Date of Patent: Feb. 26, 2019

(54) TRUCK TAILGATE SYSTEM

(71) Applicant: FORD GLOBAL TECHNOLOGIES, LLC, Dearborn, MI (US)

(72) Inventors: Joshua Robert Hemphill, White Lake, MI (US); Jack Marchlewski, Saline, MI (US); Dragan B. Stojkovic, Taylor, MI (US); Jeffrey Gray, Dearborn, MI (US); Robert Reiners, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/601,408

(22) Filed: May 22, 2017

(65) Prior Publication Data

US 2018/0334198 A1 Nov. 22, 2018

(51) Int. Cl.
*B62D 33/027* (2006.01)
*B62D 33/03* (2006.01)
*B60Q 1/30* (2006.01)
*B60P 1/43* (2006.01)

(52) U.S. Cl.
CPC ......... *B62D 33/0273* (2013.01); *B60Q 1/307* (2013.01); *B62D 33/03* (2013.01); *B60P 1/43* (2013.01); *B60P 1/435* (2013.01); *B60Q 1/30* (2013.01); *B62D 33/027* (2013.01)

(58) Field of Classification Search
CPC .. B60J 5/10; B60P 1/435; B60R 11/06; B62D 33/023; B62D 33/027; B62D 33/0273; B62D 33/03

USPC .......................................... 296/50, 51, 57.1
See application file for complete search history.

(56) References Cited

U.S. PATENT DOCUMENTS

| | | | |
|---|---|---|---|
| 5,169,202 A * | 12/1992 | Cupp | B60P 1/435 269/900 |
| 5,556,151 A | 9/1996 | New et al. | |
| 6,802,552 B2 * | 10/2004 | Hunt | B60J 5/108 296/57.1 |
| 6,991,277 B1 | 1/2006 | Esler | |
| 7,677,626 B2 | 3/2010 | Hanzel | |
| 7,819,295 B2 * | 10/2010 | Plavetich | B60P 1/435 224/403 |
| 2004/0084925 A1 * | 5/2004 | Ojanen | B62D 29/008 296/50 |
| 2008/0190977 A1 | 8/2008 | Estabrook | |
| 2015/0061319 A1 * | 3/2015 | Johnson | B62D 33/023 296/183.1 |
| 2016/0023691 A1 * | 1/2016 | Bales | B60R 9/06 296/37.6 |
| 2016/0236625 A1 * | 8/2016 | Kogut | B60R 11/00 |

* cited by examiner

*Primary Examiner* — Jason S Daniels
(74) *Attorney, Agent, or Firm* — Jason Rogers; Brooks Kushman P.C.

(57) ABSTRACT

A vehicle includes a truck bed and an extruded tailgate that is rotatably secured to the bed. The extruded tailgate forms laterally extending internal, external, upper, and lower panels. The exterior surfaces of each of the internal, upper, and lower panels define T-slots that are configured to receive accessory components.

19 Claims, 4 Drawing Sheets

TRUCK TAILGATE SYSTEM

TECHNICAL FIELD

The present disclosure relates to vehicles, such as trucks, that include cargo beds and tailgates that provide access to the cargo beds.

BACKGROUND

Vehicle or truck accessories may be added to a specific vehicle or truck model by the manufacturer prior to being sold to the consumer. Alternatively, aftermarket accessories may be added to the vehicle or truck by the consumer.

SUMMARY

An extruded tailgate includes an internal panel, external panel, upper panel, and lower panel. The internal and external panels are secured to each other by the upper and lower panels that extend between internal and external panels. The internal, external, upper, and lower panels all extend from a first lateral end of the tailgate to a second lateral end of the tailgate. An exterior surface of the internal panel defines a first T-slot that is configured to receive accessory components. The T-slot extends from the first to the second lateral end.

A vehicle includes a truck bed and an extruded tailgate that is rotatably secured to the bed. The extruded tailgate forms laterally extending internal, external, upper, and lower panels. The exterior surfaces of each of the internal, upper, and lower panels define T-slots that are configured to receive accessory components.

An extruded tailgate includes an internal panel, external panel, upper panel, and lower panel. The internal, external, upper, and lower panels form a closed cross-sectional area and define a cavity therebetween. The internal, external, upper, and lower panels extend from a first lateral end to second lateral end of the tailgate. Exterior surfaces of each of the internal, external, upper, and lower panels define T-slots that are configured to receive accessory components. The first and second lateral ends are open such that the cavity is accessible.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
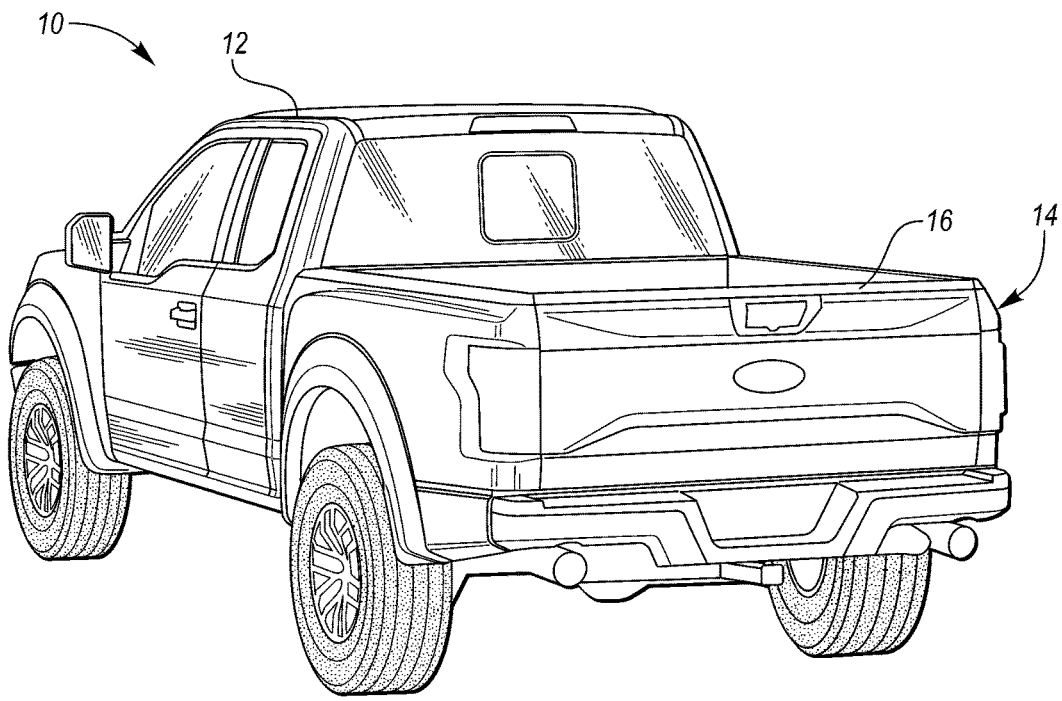
FIG. 1 is a perspective view of a vehicle, such as a truck, having a cargo or truck bed.

Referring to FIG. 1, a vehicle 10 is illustrated. The illustrated vehicle 10 may be a truck. The vehicle 10 may include a body 12 (that includes a cabin space) and a cargo bed (or truck bed) 14. The body 12 and the cargo bed 14 may each be secured to a frame. A tailgate 16 that provides access to the cargo bed 14 may be rotatably secured to the cargo bed 14. The tailgate is shown to be in an up and closed position. The body 12 and cargo bed 14 may include various components of the vehicle's body-in-white structure. The body-in-white structure may include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of the vehicle body-in-white structure or the frame known in the art. The body components may be connected to each other by a welding process or by fasteners, such as rivets, screws, bolts, or any other type of faster known to a person of ordinary skill in the art.

Figure 2:
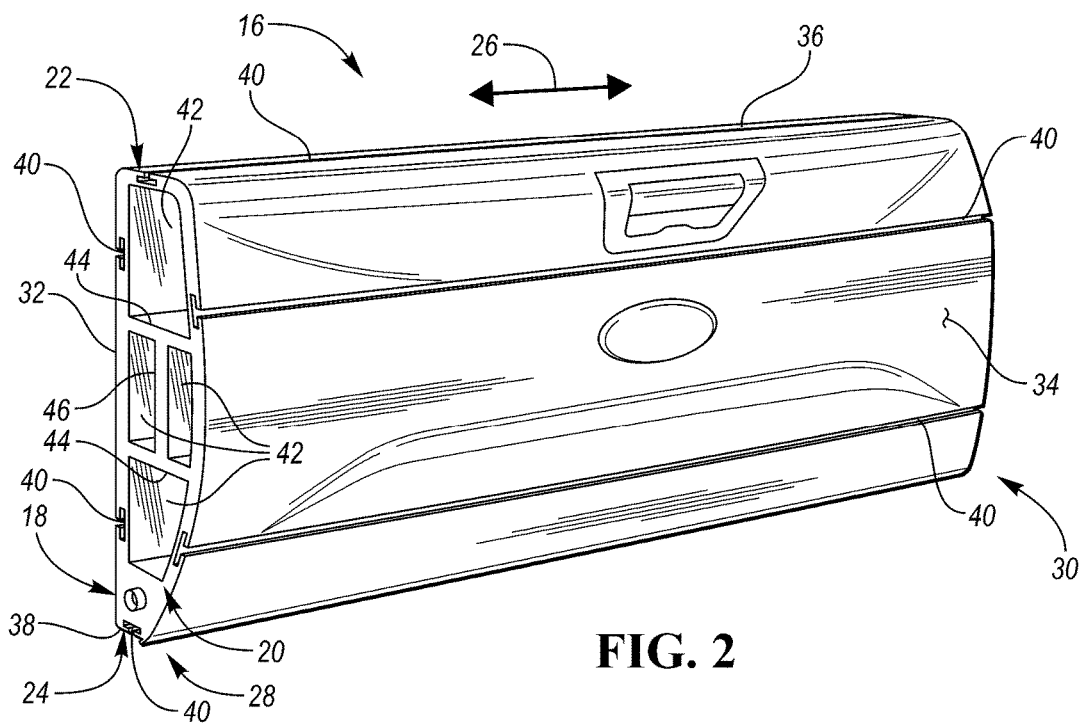
FIG. 2 is a perspective view of a tailgate.

Referring to FIG. 2, a perspective view of the tailgate 16 is illustrated. The tailgate 16 may be manufactured via an extrusion process such that the tailgate forms a singular solid piece as opposed to being formed from multiple pieces, such as metal sheets, that are secured to each other by welds, crimps, fasteners, etc. The tailgate 16 includes or forms an internal panel 18 and an external panel 20. The tailgate 16 also includes or forms an upper panel 22 and a lower panel 24. The internal panel 18 and the external panel 20 may be secured to each other by the upper panel 22 and the lower panel 24 that each extend between the internal panel 18 and the external panel 20. The internal panel 18, external panel 20, upper panel 22, and lower panel 24 extend in a lateral direction 26, relative to the tailgate 16, from a first lateral end 28 of the tailgate 16 to a second lateral end 30 of the tailgate 16. An exterior surface 32 of the internal panel 18, an exterior surface 34 of the external panel 20, an exterior surface 36 of the upper panel 22, and an exterior surface 38 of the lower panel 24 each may define T-slots 40 that are configured to receive accessory components. The T-slots 40 may extend in the lateral direction 26 from the first lateral end 28 to the second lateral end 30 of the tailgate 16.

The internal panel 18, external panel 20, upper panel 22, and lower panel 24 form a closed cross-sectional area. The closed cross-sectional area defines a cavity 42 between the internal panel 18, external panel 20, upper panel 22, and lower panel 24. The first lateral end 28 and/or the second lateral end 30 of the tailgate 16 may be open such that the cavity 42 is accessible from the first lateral end 28 and/or the second lateral end 30.

A pair of support panels 44 may be disposed within the cavity 42. The pair of support panels 44 may extend from the first lateral end 28 to the second lateral end 30 of the tailgate 16. The pair of support panels 44 may span the cavity 42 from the internal panel 18 to the external panel 20. The pair of support panels 44 may be substantially perpendicular to the internal panel 18. Substantially perpendicular may include any incremental value ranging from +10° to −10° from exactly perpendicular. A third support panel 46 may be disposed within the cavity 42. The third support panel 46 may extend from the first lateral end 28 to the second lateral end 30 of the tailgate 16. The third support panel 46 may span that cavity 42 between the pair of support panels 44 (i.e., the third support panel 46 may extend from the first of the pair of support panels 44 to the second of the pair of support panels 44 within the cavity 42). The third support panel 46 may be substantially parallel to the internal panel 18. Substantially parallel may include any incremental value ranging from +10° to −10° from exactly parallel. The pair of support panels 44 and the third support panel 46 may partition the cavity 42 into several separate cavities.

The exterior surface 32 of the internal panel 18 may more specifically define one or more T-slots 40 (first and second T-slots 40 are shown). The cross-sectional areas of the first and second T-slots 40 defined by exterior surface 32 of the internal panel 18 may be substantially parallel relative to each other. Substantially parallel may include any incremental value ranging from +10° to −10° from exactly parallel.

The exterior surface 36 of the upper panel 22 may more specifically define a single T-slot 40. The cross-sectional area of the T-slot 40 defined by the exterior surface 36 of the upper panel 22 may be substantially perpendicular to the cross-sectional area of the first and/or second T-slots 40 defined by exterior surface 32 of the internal panel 18. Substantially perpendicular may include any incremental value ranging from +10° to −10° from exactly perpendicular.

The exterior surface 38 of the lower panel 24 may more specifically define a single T-slot 40. The cross-sectional area of the T-slot 40 defined by the exterior surface 38 of the lower panel 24 may be substantially perpendicular to the cross-sectional area of the first and/or second T-slots 40 defined by exterior surface 32 of the internal panel 18. Substantially perpendicular may include any incremental value ranging from +10° to −10° from exactly perpendicular. The cross-sectional area of the T-slot 40 defined by the exterior surface 36 of the upper panel 22 and the cross-sectional area of the T-slot 40 defined by the exterior surface 38 of the lower panel 24 may be oriented at substantially 180° relative to each other. Oriented at substantially 180° relative to each other may include any incremental value ranging from +10° to −10° from 180°.

The exterior surface 34 of the external panel 20 may more specifically define one or more T-slots 40 (first and second T-slots 40 are shown). The cross-sectional areas of the first and second T-slots 40 defined by exterior surface 34 of the external panel 20 may be substantially parallel relative to each other. Substantially parallel may include any incremental value ranging from +10° to −10° from exactly parallel. The cross-sectional areas of the first and second T-slots 40 defined by exterior surface 34 of the external panel 20 may be substantially perpendicular to the either the T-slot 40 defined by the exterior surface 36 of the upper panel 22 or the T-slot 40 defined by exterior surface 38 of the lower panel 24. Substantially perpendicular may include any incremental value ranging from +10° to −10° from exactly perpendicular. The cross-sectional areas of the first and second T-slots 40 defined by exterior surface 34 of the external panel 20 and the cross-sectional areas of the first and second T-slots 40 defined by exterior surface 32 of the internal panel 18 may be oriented at substantially 180° relative to each other. Oriented at substantially 180° relative to each other may include any incremental value ranging from +10° to −10° from 180°.

Figure 3:
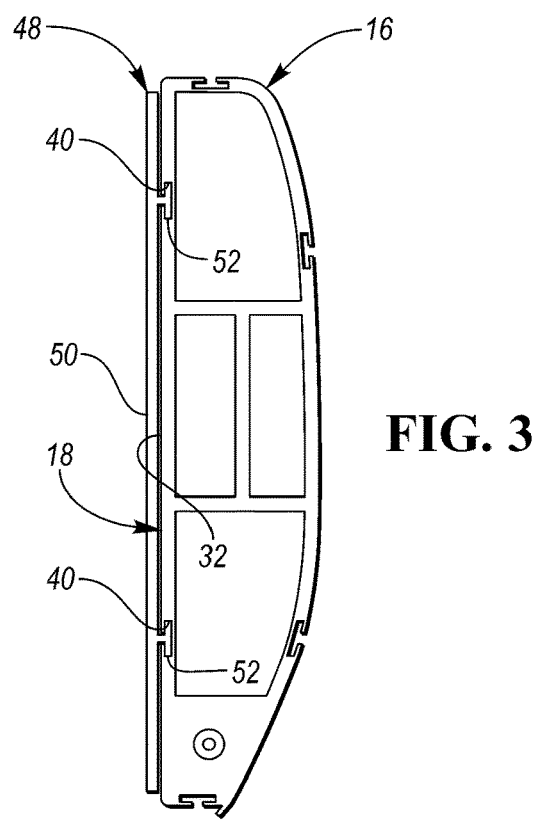
FIG. 3 is a side view of the tailgate and an accessory having a flat working surface that is secured to the tailgate.

Referring to FIG. 3, a side view of the tailgate 16 and an accessory 48 that is secured to the tailgate 16 is illustrated. The accessory 48 may be referred to as an accessory plate. The accessory plate may include a flat working surface 50 and at least one T-shaped protrusion 52 disposed on an opposing side of the accessory plate relative to the flat working surface 50. The at least one T-shaped protrusion 52 may engage the one or more T-slots 40 defined by the exterior surface 32 of the internal panel 18 in order to secure the accessory plate to the internal panel 18.

Figure 4:
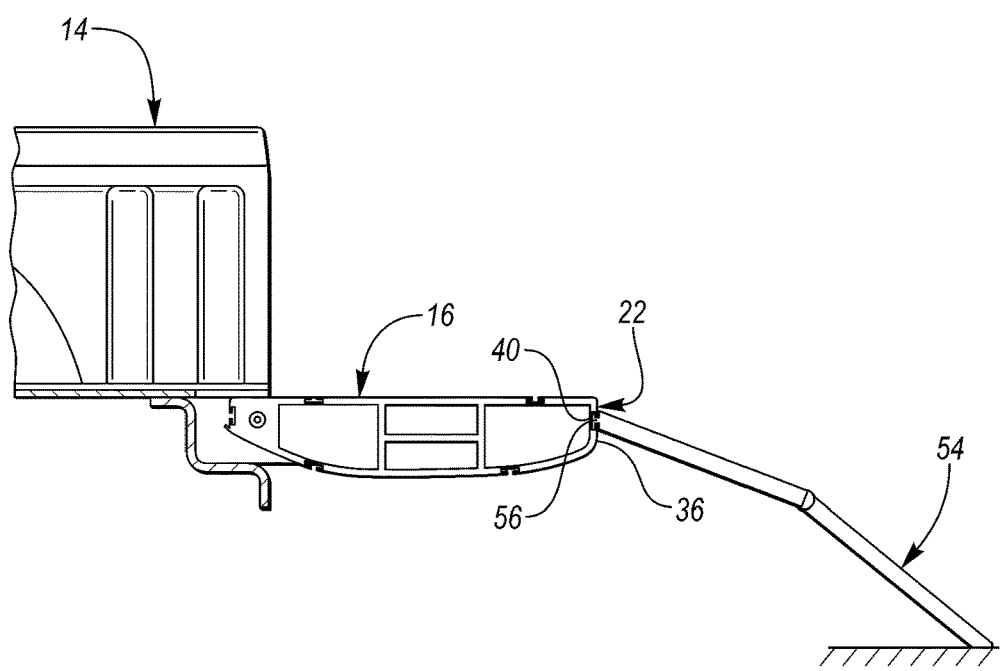
FIG. 4 is a cross-sectional view of the truck bed that includes a side view of the tailgate and a ramp that is secured to the tailgate.

Referring to FIG. 4, a cross-sectional view of the truck bed 14, that includes a side view of the tailgate 16 and a ramp 54 that is secured to the tailgate 16, is illustrated. The ramp 54 has a T-shaped protrusion 56 disposed along an end of the ramp 54. The T-shaped protrusion 56 engages the T-slot 40 defined by the exterior surface 36 of the upper panel 22 in order to secure the ramp 54 to upper panel 22. Once secured to the upper panel 22, the ramp 54 may extend from the upper panel 22, when the tailgate 16 is in a down and opened position, to the ground.

Figure 5:
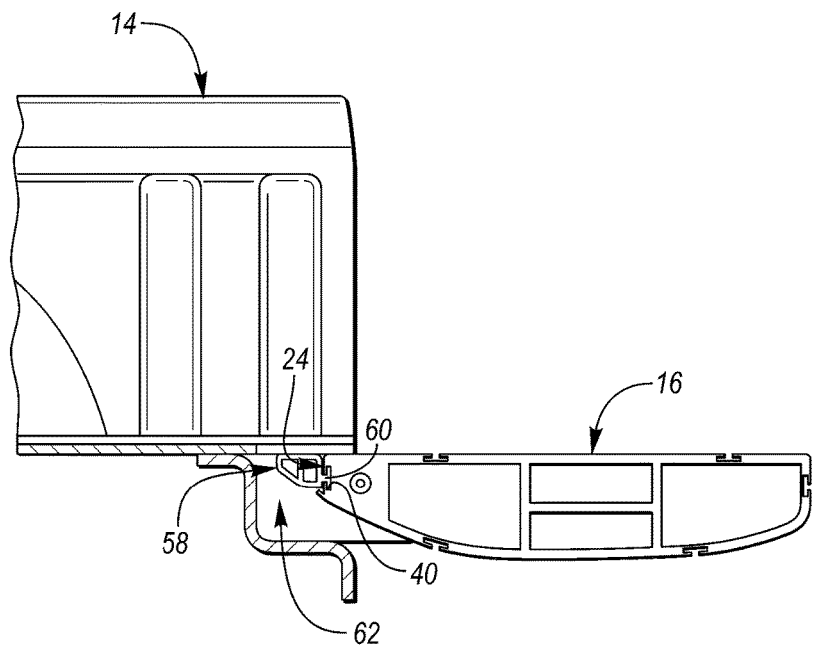
FIG. 5 is a cross-sectional view of the truck bed that includes a side view of the tailgate and an elastic guard that is secured to the tailgate.

Referring to FIG. 5, a cross-sectional view of the truck bed 14, that includes a side view of the tailgate 16 and an elastic guard 58 that is secured to the tailgate 16, is illustrated. The elastic guard 58 may be made from any flexible material that has sealing properties, such as rubber. The elastic guard 58 may have T-shaped protrusion 60. The T-shaped protrusion 60 engages the T-slot 40 defined by exterior surface 38 of the lower panel 24 to secure the elastic guard 58 to the lower panel 24 such that the elastic guard 58 is disposed within a gap 62 that extends between the lower panel 24 and the truck bed 14. The elastic guard 58 may extend from the first lateral end 28 to the second lateral end 30 of the tailgate 16.

Figure 6:
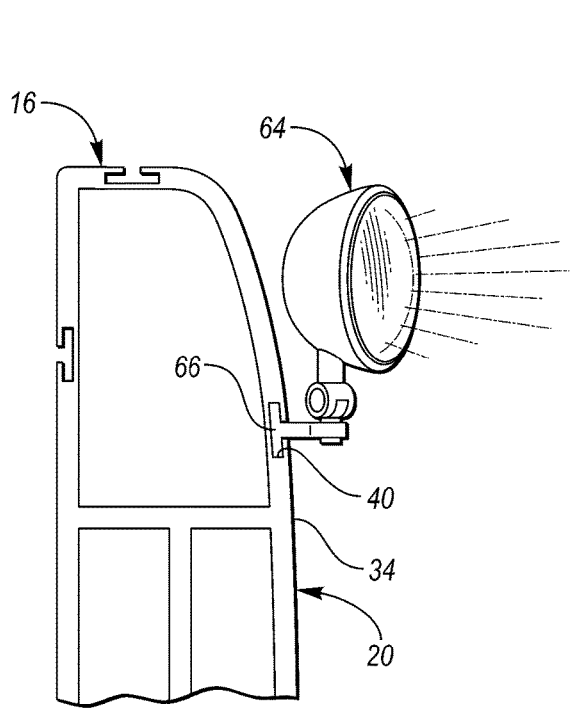
FIG. 6 is a side view of the tailgate and a flood light that is secured to the tailgate.

Referring to FIG. 6, a side view of the tailgate 16 and a flood light 64 that is secured to the tailgate 16 is illustrated. The flood light 64 may have a T-shaped protrusion 66. The T-shaped protrusion 66 engages the T-slot 40 defined by the exterior surface 34 of the external panel 20 in order to secure the flood light 64 to the external panel 20.

Figure 7:
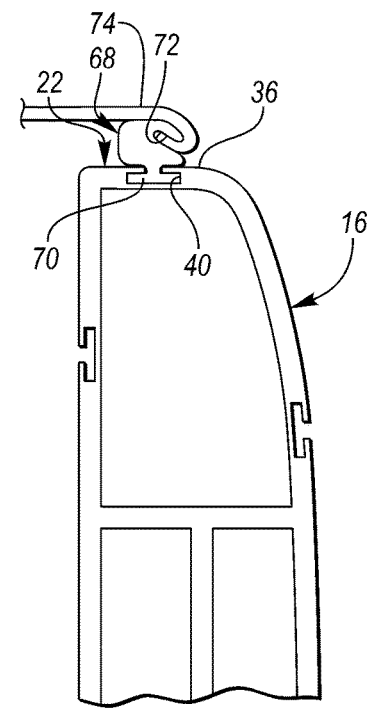
FIG. 7 is a side view of the tailgate and a tailgate top cover that is secured to the tailgate.

Referring to FIG. 7, a side view of the tailgate 16 and a tailgate top cover 68 that is secured to the tailgate 16 is illustrated. The tailgate top cover 68 may have a T-shaped protrusion 70 that extends downward. The tailgate top cover 68 may define a slot 72 configured to receive a tonneau cover 74. The T-shaped protrusion 70 engages the T-slot 40 defined by the exterior surface 36 of the upper panel 22 to secure the tailgate top cover 68 to the upper panel 22. The tailgate top cover 68 may extend from the first lateral end 28 to the second lateral end 30 of the tailgate 16.

Figure 8A:
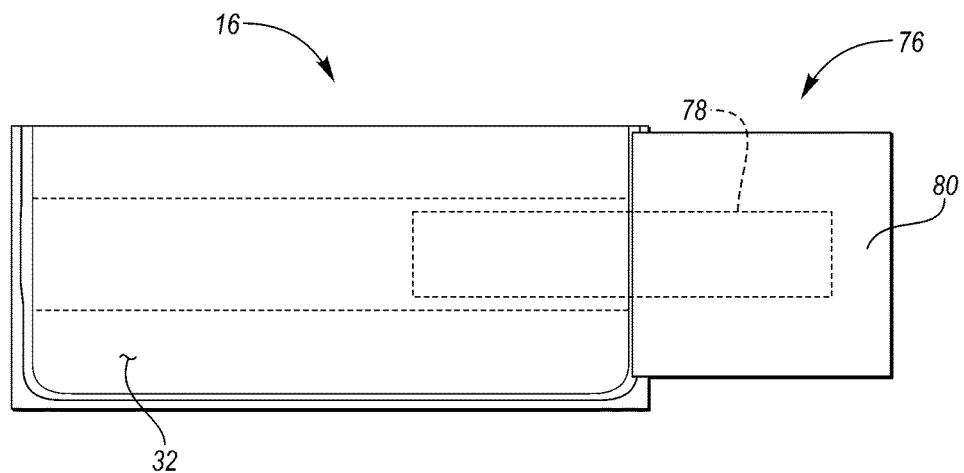
FIGS. 8A and 8B are top and front views, respectively, of the tailgate including a fold-out table accessory.
Figure 8B:
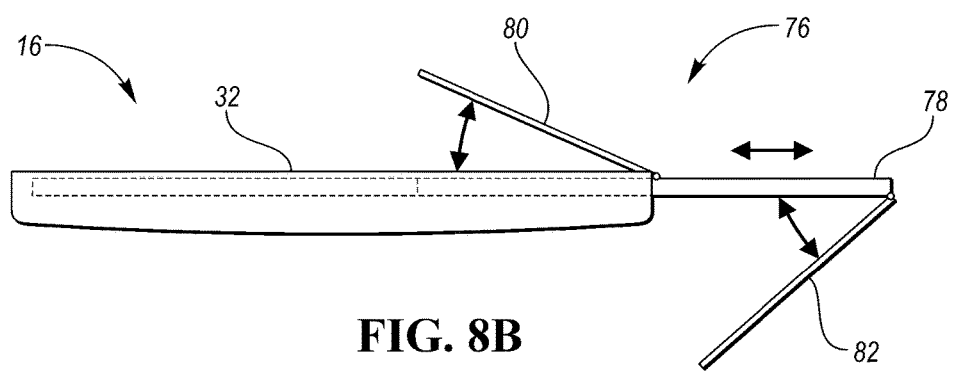

Referring to FIGS. 8A and 8B, top and front views of the tailgate 16 including a fold-out table accessory 76 are, respectively, illustrated. The fold-out table accessory 76 includes a support platform 78 that is disposed within the cavity 42 between the internal panel 18 and the third support panel 46. The support platform 78 may also be disposed within the cavity 42 between the pair of support panels 44. The support platform 78 is configured to transition from a retracted (or stowed) position, where the support platform 78 is positioned or disposed completely within the cavity 42, to an advanced position where the support platform 78 partially extends out of the cavity 42. The fold-out table accessory 76 also includes a table top 80 that is rotatably secured to the tailgate 16. The table top 80 is configured to rest upon the exterior surface 32 of the internal panel 18 when in a retracted (or stowed) position. The table top 80 is configured to rest upon the support platform 78 when both the table top 80 and the support platform 78 are in advanced positions. A support leg 82 may be rotatably secured to the support platform 78. The support leg 82 may be configured to fold upward and extend into the cavity 42, along with the support platform 78, when the support leg 82 and the support platform 78 are both in retracted (or stowed) positions. The support leg 82 may be configured to fold downward and extend between the ground and support platform 78 to provide support to the fold-out table accessory 76 when the support platform 78 is in the advanced position.

Additionally, in the absence of having a fold-out table accessory 76, boards of varying sizes may be inserted into the cavity 42 between the internal panel 18 and the third support panel 46. The boards them may be pulled out to various lengths such that a cutting operation may be performed on the board in order cut the board into shorter sections.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An extruded tailgate comprising:
   internal and external panels secured to each other by upper and lower panels extending therebetween, wherein the internal, external, upper, and lower panels extend from a first to a second lateral end of the tailgate, wherein exterior surfaces of the internal and lower panels define first and second T-slots, respectively, configured to receive accessory components, that extend from the first to the second lateral end; and
   an elastic guard having a T-shaped protrusion engaging the second T-slot to secure the elastic guard to the lower panel such that the elastic guard is disposed within a gap that extends between the lower panel and a truck bed.

2. The tailgate of claim 1, wherein the exterior surface of the internal panel defines a third T-slot, configured to receive the accessory components, that extends from the first to the second lateral end, wherein the third T-slot has a cross-sectional area that is substantially parallel to the first T-slot.

3. The tailgate of claim 1, wherein an exterior surface of the upper panel defines a third T-slot, configured to receive the accessory components, that extends from the first to the second lateral end, wherein the third T-slot has a cross-sectional area that is substantially perpendicular to the first T-slot.

4. The tailgate of claim 1, wherein the second T-slot has a cross-sectional area that is substantially perpendicular to the first T-slot.

5. The tailgate of claim 1, wherein an exterior surface of the external panel defines a third T-slot, configured to receive the accessory components, that extends from the first to the second lateral end, wherein the third T-slot has a cross-sectional area that is oriented at substantially 180° relative to the first T-slot.

6. The tailgate of claim 1, wherein the internal, external, upper, and lower panels define a cavity therebetween, and further comprising a pair of support panels, disposed within the cavity, that extend from the first to the second lateral end, span the cavity from the internal panel to the external panel, and are substantially perpendicular to the internal panel.

7. The tailgate of claim 6 further comprising a third support panel, disposed within the cavity, that extends from the first lateral end to the second lateral end, spans that cavity between the pair of support panels, and is substantially parallel to the internal panel.

8. The tailgate of claim 7, wherein the first lateral end is open such that the cavity is accessible.

9. A vehicle comprising:
   a truck bed;
   an extruded tailgate, rotatably secured to the bed, forming laterally extending internal, external, upper, and lower panels, wherein exterior surfaces of each panel define T-slots configured to receive accessory components; and
   a top cover having a T-shaped protrusion extending downward and defining a tonneau cover receiving slot, the T-shaped protrusion engaging the T-slot defined by the upper panel to secure the cover to the upper panel.

10. The vehicle of claim 9, wherein the internal, external, upper, and lower panels extend from a first lateral end of the extruded tailgate to a second lateral end of the extruded tailgate and define a cavity therebetween.

11. The vehicle of claim 10, wherein the extruded tailgate forms a pair of laterally extending support panels that are disposed within the cavity, extend from the first lateral end to the second lateral end, span the cavity from the internal panel to the external panel, and are substantially perpendicular to the internal panel.

12. The vehicle of claim 11, wherein the extruded tailgate forms a third laterally extending support panel that is disposed within the cavity, extends from the first lateral end to the second lateral end, spans that cavity between the pair of laterally extending support panels, and is substantially parallel to the internal panel.

13. The vehicle of claim 12, wherein the first lateral end is open such that the cavity is accessible.

14. The vehicle of claim 9 further comprising an accessory plate having a flat working surface and a T-shaped protrusion on an opposing side relative to the flat working surface, wherein the T-shaped protrusion engages the T-slot defined by the internal panel to secure the accessory plate to the internal panel.

15. The vehicle of claim 9 further comprising an elastic guard having a T-shaped protrusion, wherein the T-shaped protrusion engages the T-slot defined by the lower panel to secure the elastic guard to the lower panel such that the elastic guard is disposed within a gap that extends between the lower panel and the truck bed.

16. The vehicle of claim 9 further comprising a ramp having a T-shaped protrusion disposed along an end of the ramp, wherein the T-shaped protrusion engages the T-slot defined by the upper panel to secure the ramp to upper panel.

17. The vehicle of claim 9 further comprising a flood light having a T-shaped protrusion, wherein the T-shaped protrusion engages the T-slot defined by the external panel to secure the flood light to the external panel.

18. An extruded tailgate comprising:
   internal, external, upper, and lower panels extending from a first lateral end to second lateral end of the tailgate, exterior surfaces of each panel defining T-slots configured to receive accessory components; and
   a ramp having a T-shaped protrusion disposed along an end of the ramp, wherein the T-shaped protrusion engages the T-slot defined by the upper panel to secure the ramp to the upper panel; and an elastic guard having a T-shaped protrusion, wherein the T-shaped protrusion engages the T-slot defined by the lower panel to secure the elastic guard to the lower panel such that the elastic guard is disposed within a gap that extends between the lower panel and a truck bed.

19. The tailgate of claim 18 further comprising a tailgate top cover having a T-shaped protrusion extending downward and defining a slot configured to receive a tonneau cover, wherein the T-shaped protrusion engages the T-slot defined by the upper panel to secure the tailgate top cover to the upper panel.

* * * * *